(12) United States Patent
Gottschalk

(10) Patent No.: US 12,219,935 B2
(45) Date of Patent: Feb. 11, 2025

(54) AUTOMATED LIVESTOCK CATCHING APPARATUS AND METHOD

(71) Applicant: Fast-Catch, LLC, Ellis, KS (US)

(72) Inventor: Loran Gottschalk, Ellis, KS (US)

(*) Notice: Subject to any disclaimer, the term of this patent is extended or adjusted under 35 U.S.C. 154(b) by 165 days.

(21) Appl. No.: 17/458,859

(22) Filed: Aug. 27, 2021

(65) Prior Publication Data

US 2023/0068953 A1 Mar. 2, 2023

(51) Int. Cl.
*A01K 3/00* (2006.01)

(52) U.S. Cl.
CPC .................................. *A01K 3/001* (2021.08)

(58) Field of Classification Search
CPC .......... A01K 3/001; A01K 1/0035; A01K 3/00
USPC ......................................................... 119/512
See application file for complete search history.

(56) References Cited

U.S. PATENT DOCUMENTS

| | | | |
|---|---|---|---|
| 3,095,858 A | 6/1963 | Bauer | |
| 3,931,796 A | 1/1976 | Hoffman | |
| 4,278,390 A * | 7/1981 | Ahearn | B66F 9/065 414/549 |
| 5,186,125 A | 2/1993 | Halyung | |
| 5,456,564 A * | 10/1995 | Bianchini | B60R 9/06 224/508 |
| 5,655,484 A | 8/1997 | Aaberg | |
| 5,669,332 A | 9/1997 | Riley | |
| 6,035,808 A | 3/2000 | Herman | |
| 6,067,940 A * | 5/2000 | Holder | A01K 3/001 119/512 |
| 6,698,812 B1 * | 3/2004 | Stubbs | B60P 3/04 119/843 |
| 6,964,245 B2 * | 11/2005 | Beck | A01K 1/0088 119/512 |
| 7,389,746 B2 | 6/2008 | Byl et al. | |

(Continued)

FOREIGN PATENT DOCUMENTS

| | | |
|---|---|---|
| CZ | 308227 B6 | 3/2020 |
| GB | 2449900 A | 10/2008 |

OTHER PUBLICATIONS

Calf Catcher. "Calf Catcher—Safe Calf Handling System." YouTube, uploaded by Calf Catcher, Mar. 5, 2017, www.youtube.com/watch?v=sG6EgXvhL6E. Screenshots at 0:35 and 0:45 minutes. (Year: 2017).*

(Continued)

*Primary Examiner* — Peter M Poon
*Assistant Examiner* — Hae Rie Jessica Byun
(74) *Attorney, Agent, or Firm* — D. Ward Hobson

(57) ABSTRACT

Systems and methods for mobile overhead capture of cattle are disclosed. The system generally includes an apparatus having a mobile cattle pen for securing cattle therein. A lift device having a first arm member, a second arm member and a perpendicular support member for raising and lowering the mobile cattle pen over cattle. A winch assembly detachably connected to the front of a vehicle, such as a utility terrain vehicle (UTV). The winch assembly having a cable, rotating drum and motor. Wherein, upon activation of the motor of the winch assembly, the cable pulls down the first arm member of the lift device to raise the lift device and the mobile cattle pen into the air, and upon releasing the cable the lift device and mobile cattle pen is lowered to make contact with a ground surface and capture the cattle within the mobile cattle pen.

8 Claims, 10 Drawing Sheets

(56) References Cited

U.S. PATENT DOCUMENTS

| | | | |
|---|---|---|---|
| 7,685,970 B1 | 3/2010 | Rains | |
| 8,061,303 B2 | 11/2011 | Miller | |
| 8,360,010 B1 | 1/2013 | Boaldin | |
| 8,833,307 B2 | 9/2014 | Olfert et al. | |
| 9,227,548 B1* | 1/2016 | Mack | A01B 59/062 |
| 9,578,852 B1 | 2/2017 | Riley | |
| 10,206,369 B2 | 2/2019 | Niemela et al. | |
| 10,827,722 B1 | 11/2020 | Kudlock | |
| 11,400,850 B1* | 8/2022 | Curtis, III | B60P 1/4414 |
| 2002/0139315 A1* | 10/2002 | Calvert | A01K 3/001 |
| | | | 119/512 |
| 2002/0168257 A1* | 11/2002 | Smith | B60P 1/4407 |
| | | | 414/546 |
| 2008/0292435 A1* | 11/2008 | Turner | B60P 1/4407 |
| | | | 414/462 |
| 2009/0078217 A1 | 3/2009 | Riley | |
| 2016/0304021 A1* | 10/2016 | Reinert | A01K 1/10 |
| 2017/0020106 A1 | 1/2017 | Dalzell | |

OTHER PUBLICATIONS

James, Katie. "A Ranchera's Ingenuity: Homemade Mobile Calf Pen Makes Tagging a Breeze." AgWeb, May 19, 2021, www.agweb.com/news/livestock/beef/ranchers-ingenuity-homemade-mobile-calf-pen-makes-tagging-breeze. (Year: 2021).*

* cited by examiner

AUTOMATED LIVESTOCK CATCHING APPARATUS AND METHOD

TECHNICAL FIELD

The present disclosure relates generally to the technical field of livestock capture systems and methods. In particular, to the field of automated mobile cattle capture systems and methods configured for the safe and efficient overhead capture of cattle from a moving vehicle for the purpose of separating a calf from its mother, so that a person may safely administer veterinary and other care to the calf without risk of injury from a nearby mother cow.

BACKGROUND

Livestock, such as cattle, horses, goats, sheep, pigs and the like, often require veterinary and other routine care. For example, young calves must often be physically separated from their mother so that vaccinations and other routine veterinary care can be provided to the calf without interference from the nearby mother cow. In practice, it is often difficult and extremely dangerous for persons to attempt to physically separate or get between a newborn calf and its mother to administer appropriate care. This is particularly the case, when the calf and mother cow are physically located in an open area, such as a field for example, where the mother cow and calf can run away to evade capture and where there is little to no protection for persons administering the care, if the mother cow becomes aggressive and seeks to protect the calf from the person attempting to administer the care.

Unfortunately, it is common for mother cows to become aggressive and attack persons attempting to administer care to newborn calves, sometimes causing serious bodily injury or even death to the person. Traditional methods and systems for separating newborn calves from a mother cow often involve machinery and equipment that is unsafe, heavy, cumbersome, noisy, and that requires a significant financial investment in specialized equipment that farmers and ranchers do not typically have, and which farmers and ranchers cannot use for any other purpose. Thus, providing little to no incentive for use and purchase by farmers and ranchers and leaving farmers and ranchers exposed and at risk for bodily harm.

For example, traditional systems and methods that are bulky, heavy and noisy are often of little to no real-world use because the noise immediately alerts the mother cow and calf to the traditional system and method permitting the mother cow and calf to run and evade capture. Further, traditional systems and methods that require custom built trucks and other heavy equipment are expensive and cumbersome for ranchers and farmers to use and are not usable in rough terrain or bad weather. Moreover, traditional systems and methods often provide little to no safety mechanisms to protect the person administering the care to the calf. For example, traditional systems and methods do not provide a safe and secure mechanism for persons to access the calf from a safe position away from the mother cow.

To that end it would be advantageous to provide an improved system and method configured for safe, quiet, and efficient automated overhead capture of cattle utilizing a mobile cattle pen and a lift device detachably connected to a winch assembly. The winch assembly detachably mounted to a front portion of a vehicle, such as a utility task vehicle, so that the mobile cattle pen may be automatically and quietly raised and lowered over the cattle for overhead capture. Thus, providing significant safety, cost and convenience advantages over traditional systems and methods.

It is to such improved systems and methods that exemplary embodiments of the inventive concepts disclosed and claimed herein are directed.

SUMMARY

Systems and methods for automated overhead capture of cattle are disclosed. In one embodiment, an apparatus for mobile overhead capture of cattle is disclosed. The apparatus including a mobile cattle pen for securing cattle therein. The mobile cattle pen including an open top, an open bottom, a front railing, a first side railing having a plurality of openings extending through a portion of the first side railing for detachably connecting one or more roll bar thereto and one or more wheel connected substantially near the open bottom and for making contact with a ground surface. The mobile cattle pen including a second side railing having one or more wheel connected substantially near the open bottom and for making contact with a ground surface. The mobile cattle pen including a back railing including a lockable gate for rear entry and exit therefrom.

The apparatus also including a lift device for automatically raising and lowering the mobile cattle pen over cattle. The lift device including a first arm member having a first end and a second end. The first end of the first arm member having a first roll bar connected thereto and oriented in a position perpendicular to the first arm member. The first roll bar detachably connected to the first side railing of the mobile cattle pen through the plurality of openings in the first side railing. A second arm member having a first end and a second end. The first end of the second arm member having a second roll bar connected thereto and oriented in a position perpendicular to the second arm member. The second roll bar detachably connected to the first side railing of the mobile cattle pen through the plurality of openings in the first side railing. The lift device also including a perpendicular support member connected to the first arm member and the second arm member.

The apparatus further includes a winch assembly that includes a cable, rotating drum and motor. The winch assembly detachably connected to the perpendicular support member of the lift device and the cable of the winch assembly detachably connected to the second end of the first arm member of the lift device. The winch assembly for automated raising and lowering of the first arm member and the second arm member of the lift device. Wherein, upon activation of the motor of the winch assembly, the cable pulls down the first arm member of the lift device to raise the lift device and the mobile cattle pen into the air, and upon releasing the cable the lift device and mobile cattle pen is lowered to make contact with a ground surface.

In some embodiments, the apparatus further includes a vehicle, wherein the winch assembly is detachably mounted to a front portion of the vehicle. In some embodiments, the lift device is detachably mounted to a front-end loader attachment for use with a tractor or like vehicles. While the apparatus may be constructed from a variety of different materials, as disclosed herein, in some embodiments, the mobile cattle pen is preferably constructed substantially from aluminum.

A method for mobile overhead capture of cattle is also disclosed. In an embodiment, the method includes the steps of connecting a mobile cattle pen for securing cattle therein to a lift device. The mobile cattle pen including an open top, an open bottom, a front railing, a first side railing having a plurality of openings extending through a portion of the first side railing for detachably connecting one or more roll bar thereto and one or more wheel connected substantially near the open bottom and for making contact with a ground surface. The mobile cattle pen further includes a second side railing having one or more wheel connected substantially near the open bottom and for making contact with a ground surface. The mobile cattle pen further includes a back railing including a lockable gate for rear entry and exit therefrom.

The lift device includes a first arm member having a first end and a second end and a perpendicular support member. The first end of the first arm member having a first roll bar connected thereto and oriented in a position perpendicular to the first arm member. The first roll bar detachably connected to the first side railing of the mobile cattle pen through the plurality of openings in the first side railing. The lift device having a second arm member having a first end and a second end. The first end of the second arm member having a second roll bar connected thereto and oriented in a position perpendicular to the second arm member. The second roll bar detachably connected to the first side railing of the mobile cattle pen through the plurality of openings in the first side railing.

The method further includes the step of connecting the perpendicular support member of the lift device to a winch assembly. The winch assembly including a cable, rotating drum, and motor. The winch assembly detachably connected to the perpendicular support member of the lift device and the cable of the winch assembly detachably connected to the second end of the first arm member of the lift device. The winch assembly for automated raising and lowering of the first arm member and the second arm member. The method further includes the step of connecting the winch assembly to front portion of a vehicle.

In some embodiments, the method further includes the steps of automatically raising, by means of the winch assembly, the mobile cattle pen over the top of the cattle and the step of automatically lowering, by means of the winch assembly, the mobile cattle pen over the top of the cattle. Such that one or more wheel of the mobile cattle pen makes contact with the ground surface when lowered to capture the cattle therein. In some embodiments of the method the vehicle is a utility task vehicle (UTV). Further, in some embodiments of the method, the mobile cattle pen is constructed substantially from aluminum.

The systems and methods disclosed herein provide numerous advantages over traditional livestock capturing systems and methods. For example, in some embodiments, the mobile cattle pen includes a rear gate, which enables an operator to move directly from the vehicle to the mobile cattle pen without any possible interaction with a mother cow, providing significant safety advantages over traditional systems and methods. The position of the rear gate on the mobile cattle pen removes the possibility of an attack by the mother cow as the operator provides care to the calf. Further, in some embodiments, the system mechanically raises and lowers the mobile cattle pen utilizing a pre-existing winch or front loader attachment installed on the vehicle, such as a winch positioned on the front of a UTV or a front loader attachment for a tractor, for example. The position of the attachment of the apparatus at the front of the vehicle also provides significant advantages over traditional systems and methods in that it permits the operator to directly access the mobile cattle pen from the rear without any potential interaction with the mother cow thereby increasing the safety of the system and method.

Further, the system is configured to be agile and to permit an operator to quietly approach a calf and mother cow with the mobile cattle pen elevated and then to quickly lower the mobile cattle pen over the top of the calf. Thereby separating the calf from the mother cow and enabling the operator to safely tag, band and vaccinate the calf or to perform other care. The mobile cattle pen includes a plurality of wheels, preferably three, which are positioned on the bottom of the mobile cattle pen and are configured primarily for moving the mobile cattle pen to and from a UTV or other vehicle for attachment and for storage. The wheels are also used for briefly making contact with the ground when the mobile cattle pen is lowered to capture the calf therein. When the vehicle is in motion the wheels attached to the mobile cattle pen are not engaged with the ground; instead, the entire mobile cattle pen is positioned overhead in the air so that the vehicle may track the cattle and move quickly and nimbly over the terrain and position the mobile cattle pen over the cattle. Thus, providing significant noise reduction (because the wheels of the mobile cattle pen are not rattling and making noise when in contact with the ground) as compared to traditional systems and methods which have wheels that are engaged and making direct and continuous contact with the ground surface. This feature also allows effective usage on all types of rugged, wet and hilly terrain and weather conditions, (traditional systems and methods are not capable of effectively being used in such conditions).

The system is also configured to be light weight, for example, less than 100 pounds, and formed substantially from aluminum, providing significant noise reduction associated with heavier machinery and permitting use of the system with small and nimble vehicles, such as UTV's. Because the mobile cattle pen is elevated above the ground surface and in the air when in use and because the mobile cattle pen is light weight, the operator can move the vehicle quickly and easily to find the pair (mother cow and calf). Thus, avoiding significant wear and tear on both the mobile cattle pen and the vehicle which would be likely if the mobile cattle pen were in continuous contact with the ground surface when in use. The system is configured to be constructed from 1 inch square or rounded aluminum tubing for strength and durability. The use of a light-weight material such as aluminum provides significant advantages in that it permits the mobile cattle pen to be used with a small vehicle such as a UTV without burdening the suspension.

Further, the aluminum will not rust and is a strong and durable material for construction of the mobile cattle pen. The system also includes a customized linkage to the UTV so that the mobile cattle pen can be detachably connected to a standard UTV winch or front loader attachment on a tractor, for example. The connection points and linkage between the vehicle and the mobile cattle pen are configured to be tight to prevent rattling and other noise during use. The lack of noise associated with the system is also a significant improvement over traditional systems and methods and enables the operator to separate the calf from the mother cow without alerting the pair prematurely, thereby significantly increasing the safety of the system compared to traditional systems and methods.

The system is quiet, quick and easy to assemble for everyday or occasional use. The ability to reach the pair (mother cow and calf) without alerting the cows saves time and simplifies the process of capturing the calf. The speed at which the operator can move from the vehicle to the rear entry to reach the calf, coupled with the safety advantages of rear entry to the mobile cattle pen, coupled with the advantage of being able to make a stealth approach (due to the reduction in noise and light weight construction) are major and significant advantages over traditional systems and methods. Thereby making the system safer, less expensive and more practical for use.

Further, in some embodiments, the system is also configured to be collapsed when not in use for easy storage and deployed or expanded when needed for use. For example, the mobile cattle pen may be fully or partially disassembled to be stacked or stored in a collapsed position when not in use for easy and convenient storage. Likewise, the mobile cattle pen may be assembled in an expanded position or collapsed or disconnected when not in use when desired for use. In this way, the system can be more easily stored when not in use. Installation of the system is configured to be quick, efficient and easy. Because the mobile cattle pen is light weight and has wheels detachably connected thereto, the mobile cattle pen can be wheeled or pushed to a vehicle such as a UTV and then detachably connected to the front of the vehicle or UTV within seconds. In some embodiments, the system is approximately, 54.25 inches wide by 74.25 inches tall and has a length of approximately 64 inches and weighs less than approximately 100 pounds, for example.

Various other embodiments and aspects of the disclosure will become apparent based on the drawings and detailed description set forth herein.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
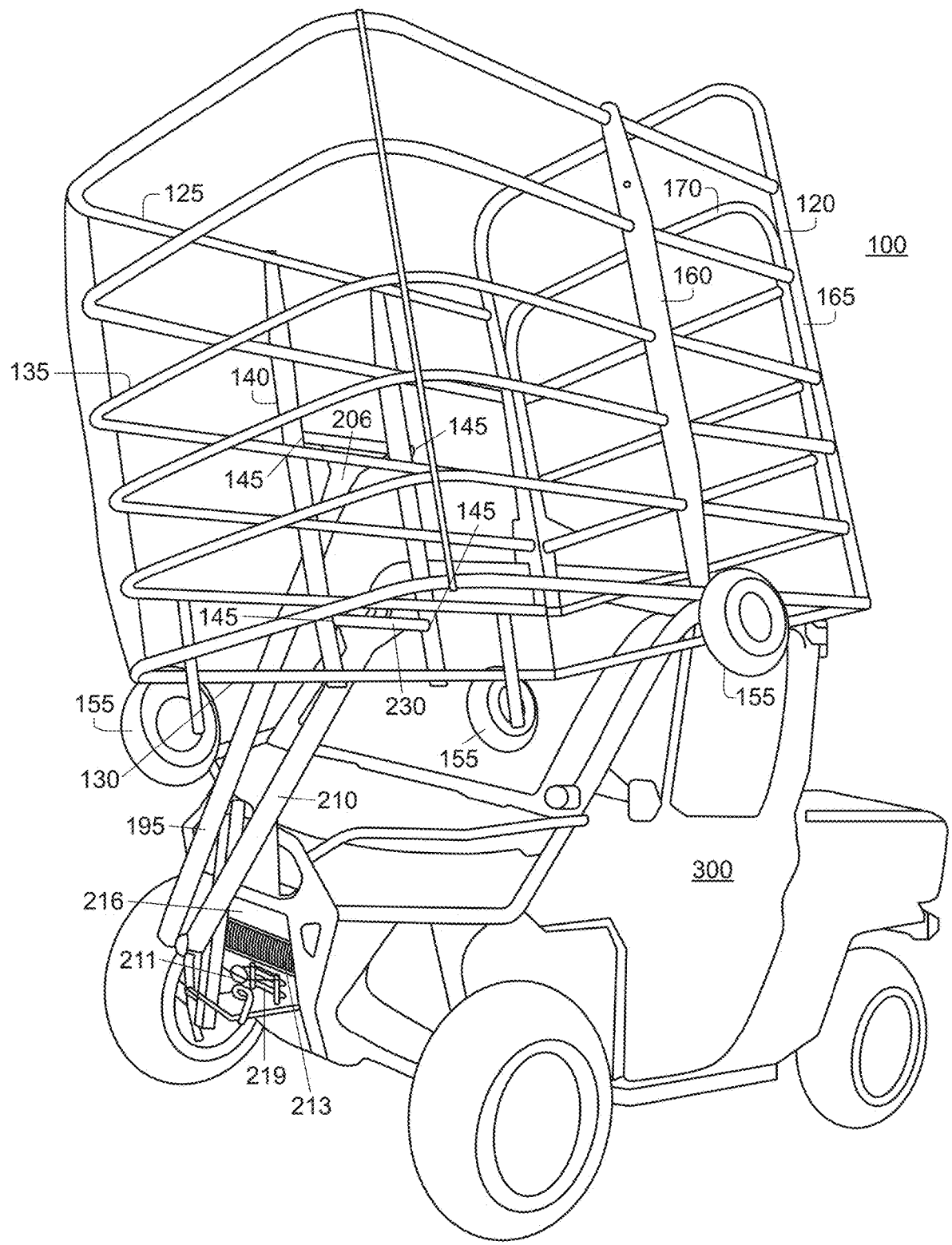
FIG. 1 is a depiction of a side perspective view of an embodiment of an apparatus (100) according to the inventive concepts disclosed herein.
Figure 2:
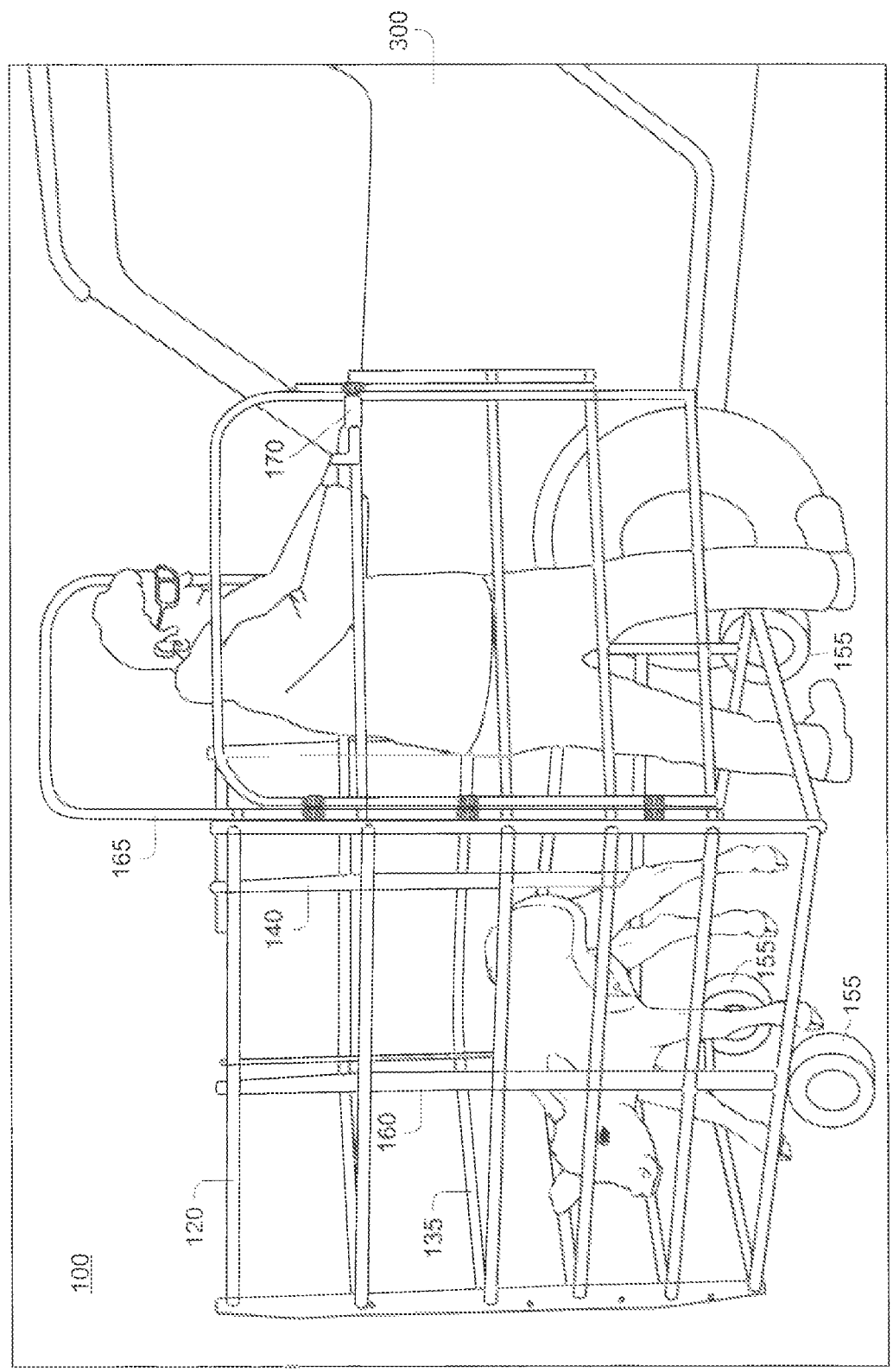
FIG. 2 is a depiction of a side perspective view of an embodiment of an apparatus (100) according to the inventive concepts disclosed herein.
Figure 3:
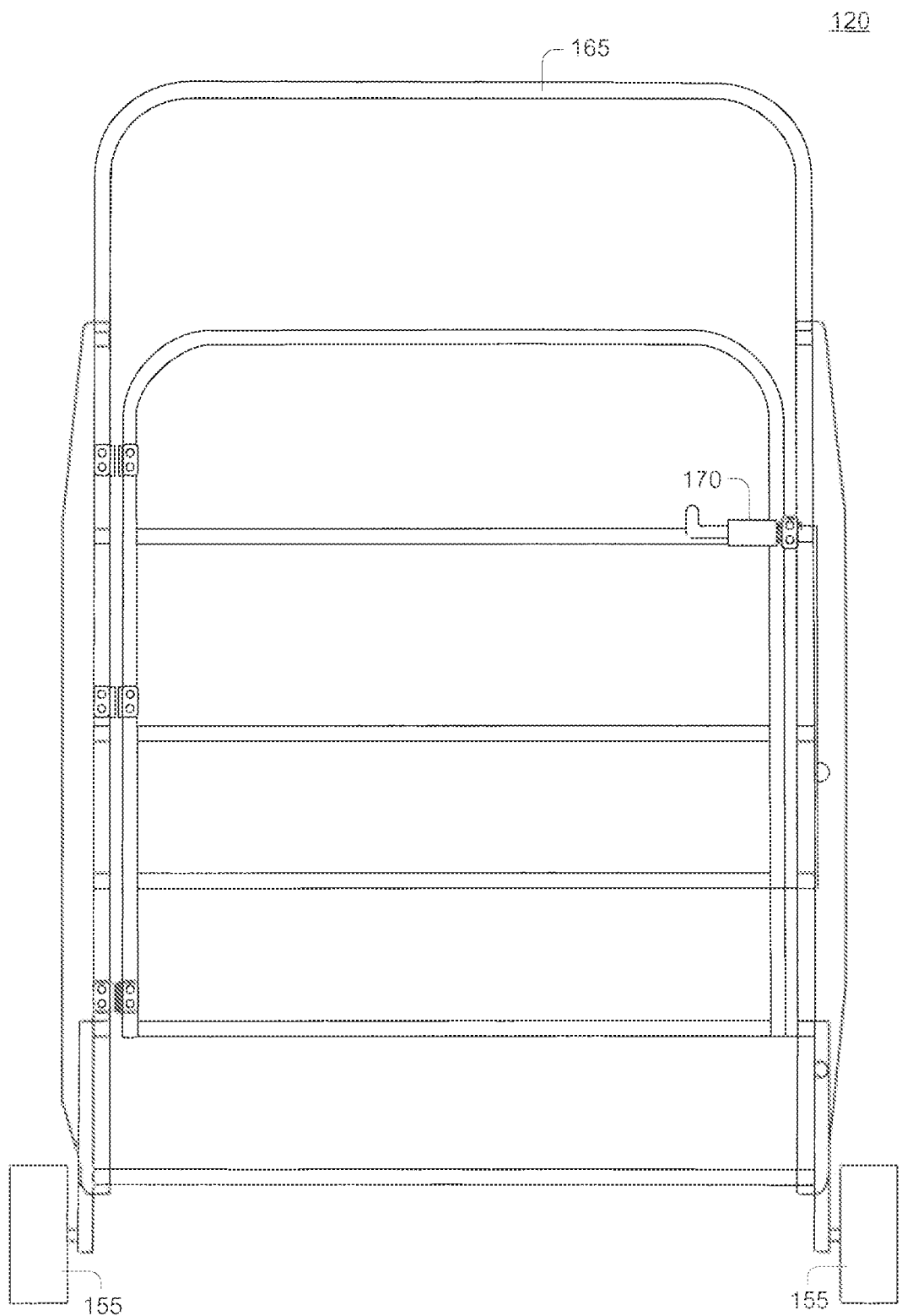
FIG. 3 is a depiction of a back view of an embodiment of a mobile cattle pen (120) of an apparatus (100) according to the inventive concepts disclosed herein.
Figure 4:
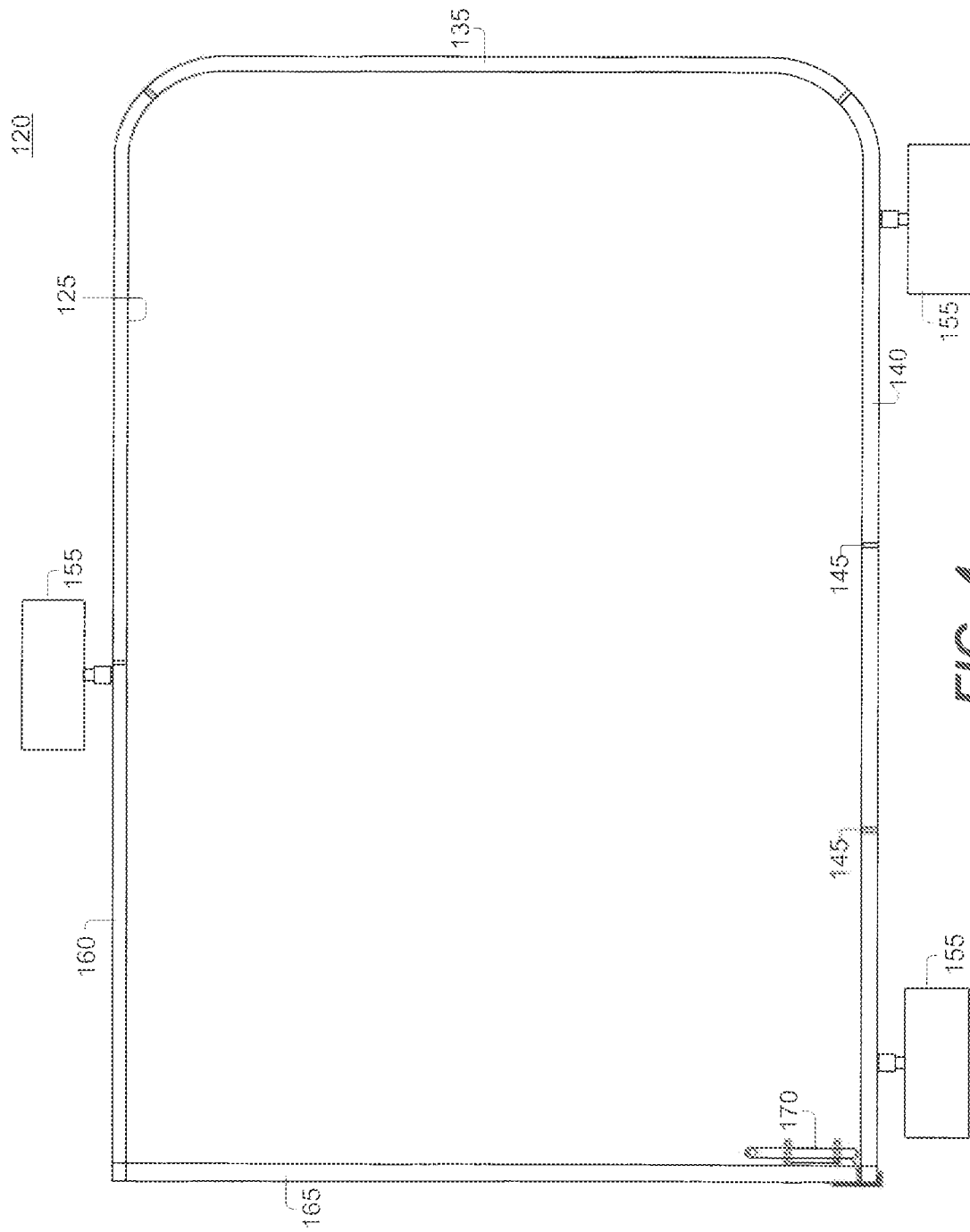
FIG. 4 is a depiction of a top view of an embodiment of a mobile cattle pen (120) of an apparatus (100) according to the inventive concepts disclosed herein.
Figure 5:
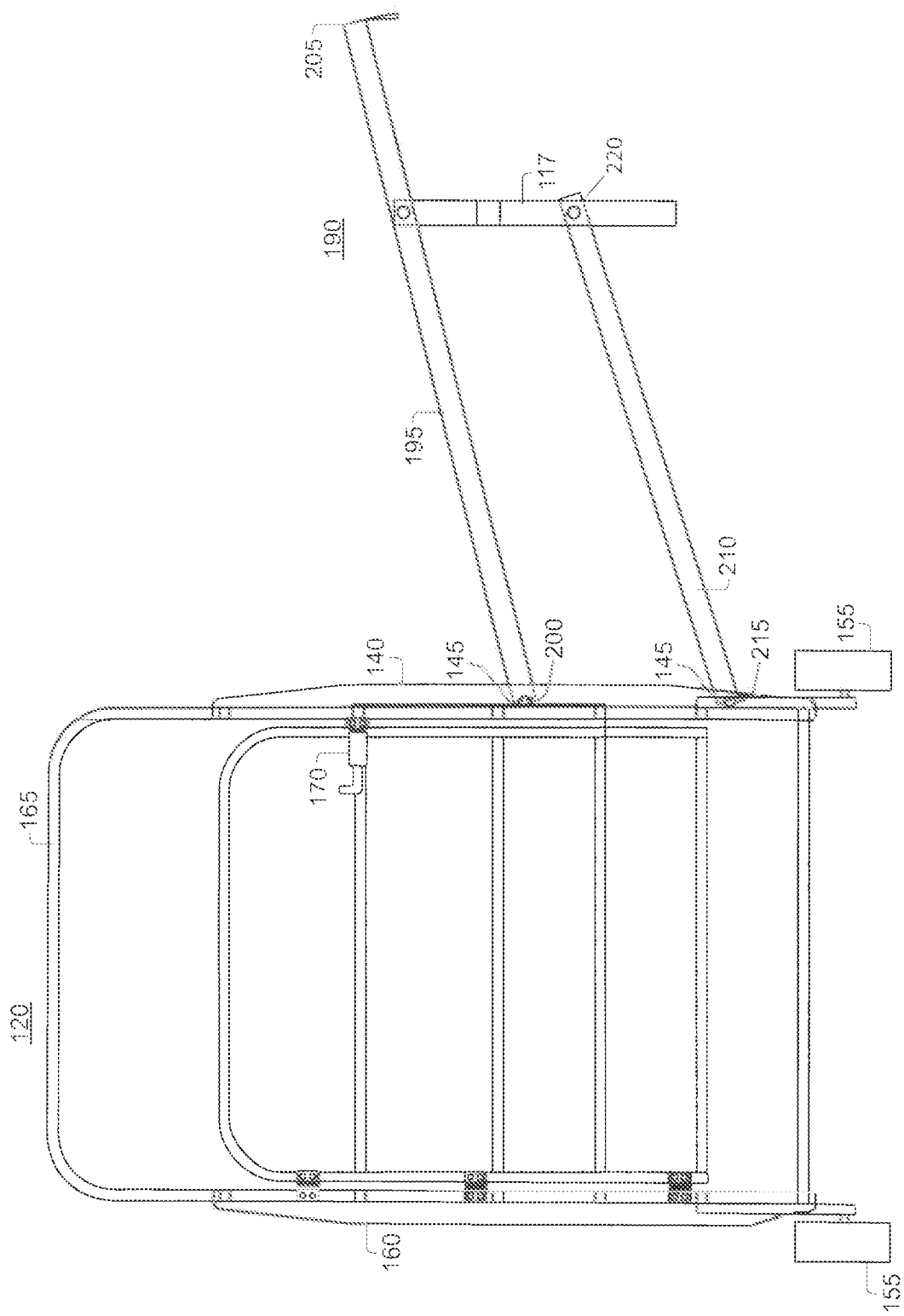
FIG. 5 is a depiction of a side view of an embodiment of a mobile cattle pen (120) connected to a lift device (190) of an apparatus (100) according to the inventive concepts disclosed herein.
Figure 6:
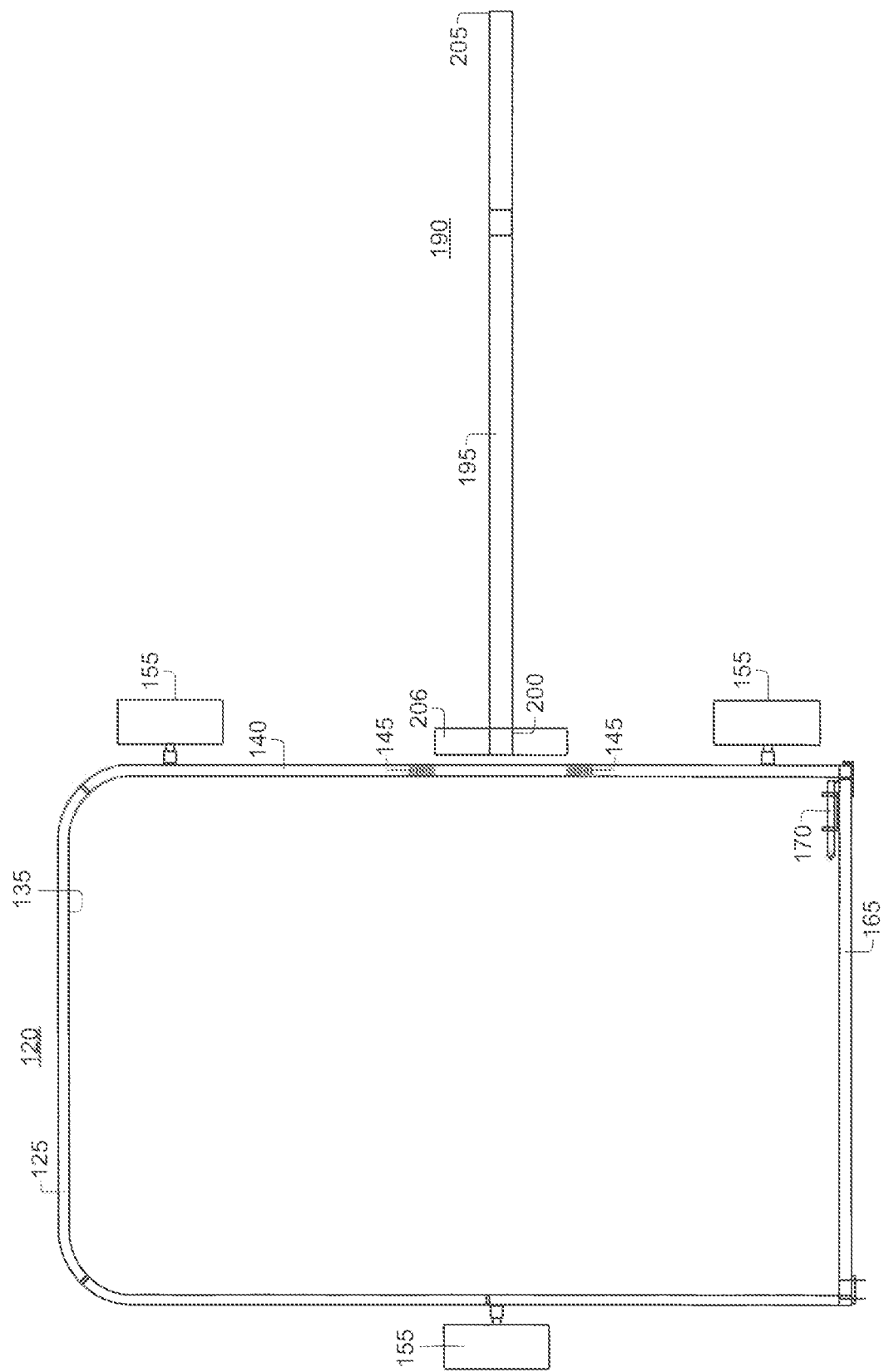
FIG. 6 is a depiction of a top view of an embodiment of a mobile cattle pen (120) and lift device (190) of an apparatus (100) according to the inventive concepts disclosed herein.
Figure 7:
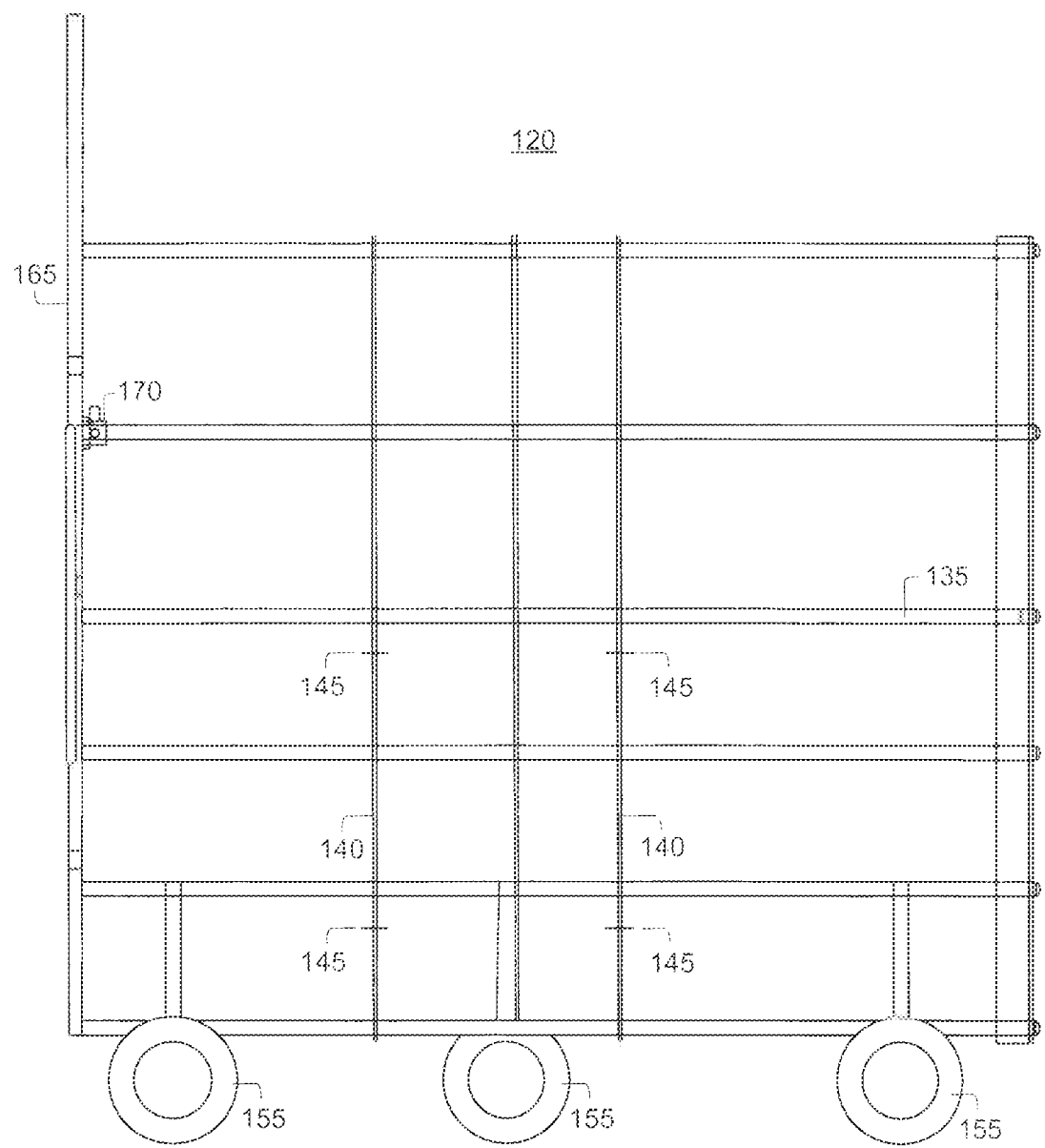
FIG. 7 is a depiction of a side view of an embodiment of a mobile cattle pen (120) of an apparatus (100) according to the inventive concepts disclosed herein.
Figure 8:
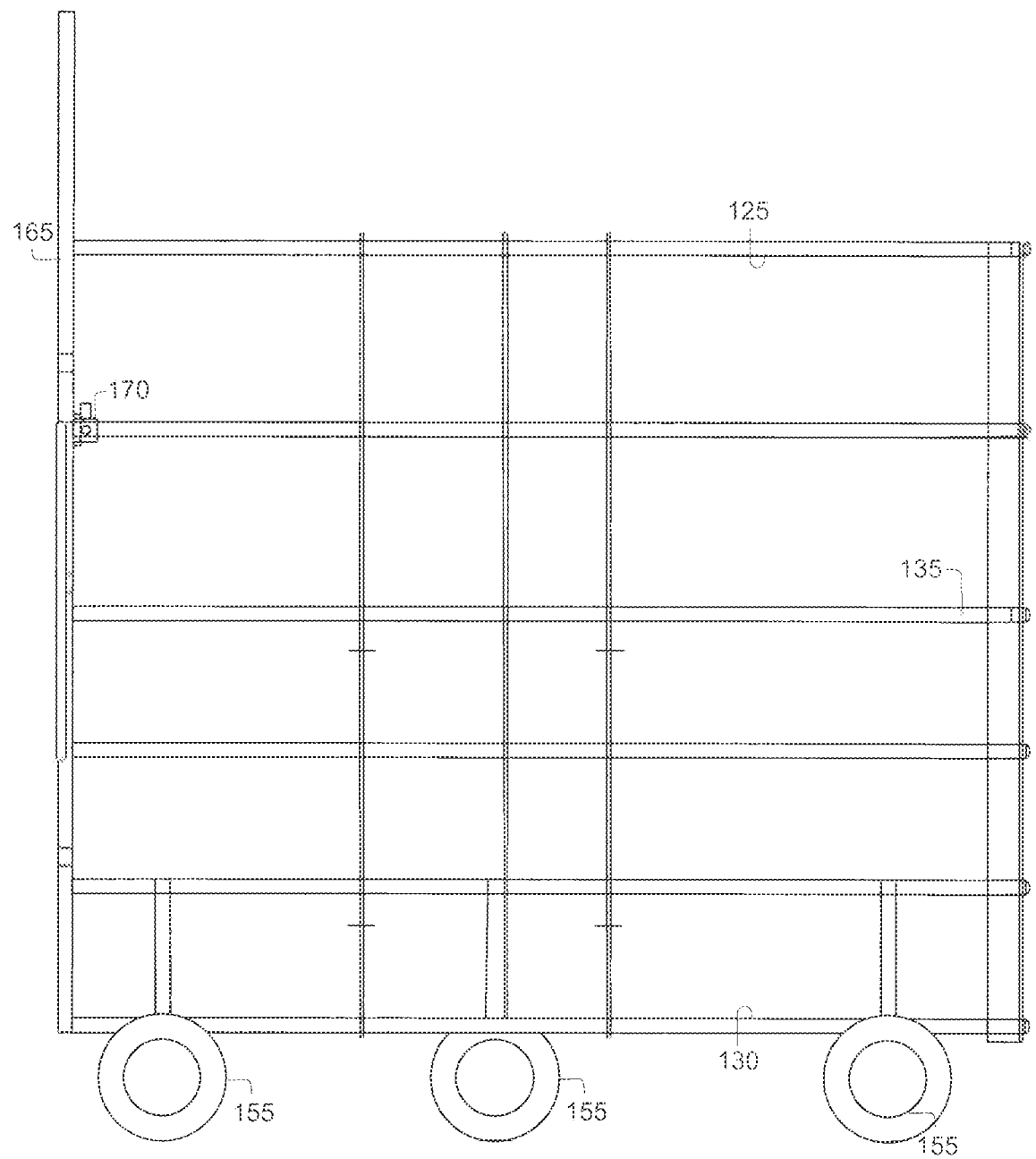
FIG. 8 is a depiction of a side view of an embodiment of a mobile cattle pen (120) of an apparatus (100) according to the inventive concepts disclosed herein.
Figure 9:
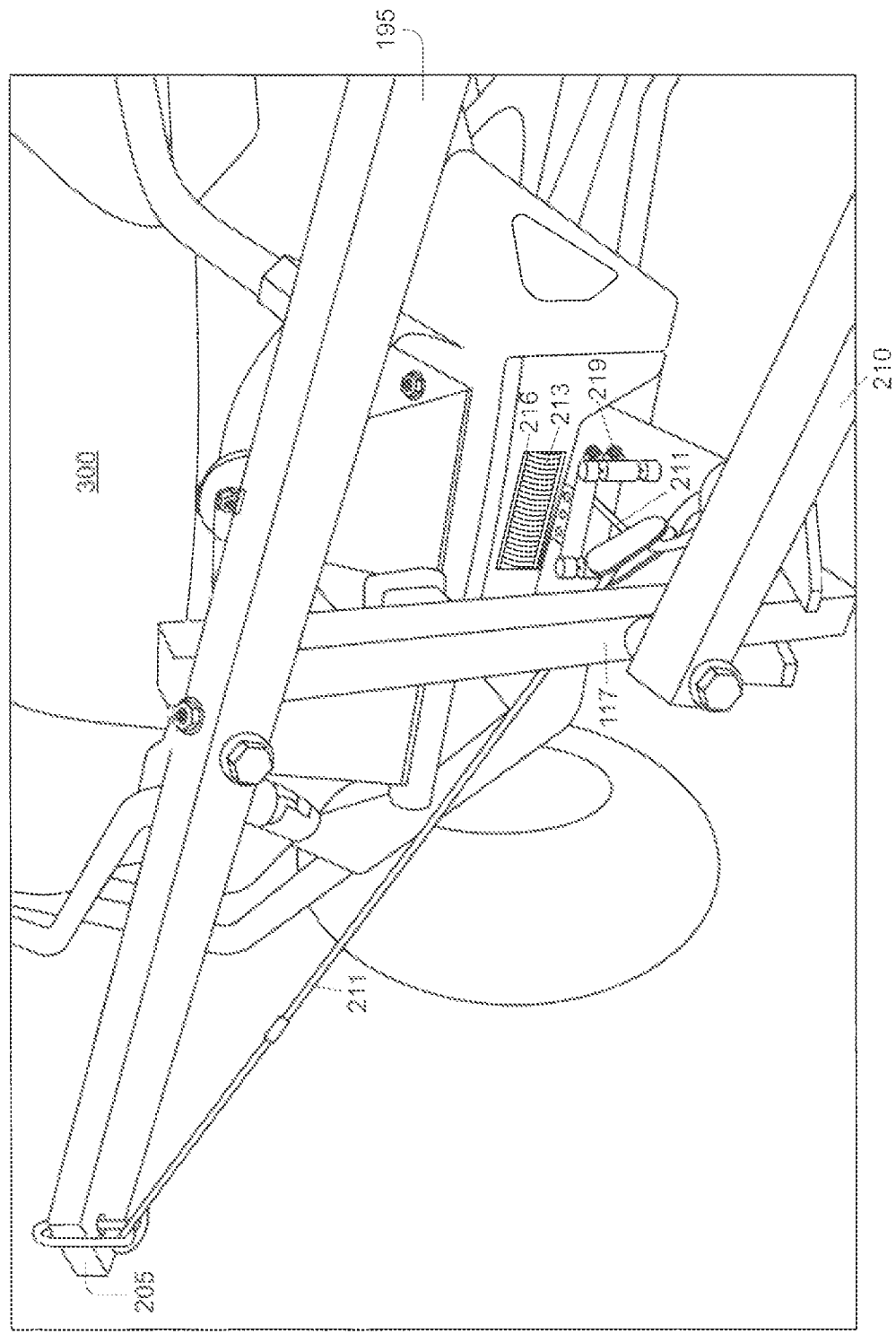
FIG. 9 is a depiction of a perspective view of lift device (190) and winch assembly (219) an embodiment of an apparatus (100) according to the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a system, process, method, article, or apparatus that comprises a list of elements is not necessarily limited to only those elements but may include other elements not expressly listed.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to systems and methods for automated overhead capture of cattle. For example, an apparatus having a mobile cattle pen for securing cattle therein. The mobile cattle pen including an open top, an open bottom, a front railing, a first side railing having a plurality of openings extending through a portion of the first side railing for detachably connecting one or more roll bar thereto and one or more wheel connected substantially near the open bottom for making contact with a ground surface. The mobile cattle pen including a second side railing having one or more wheel connected substantially near the open bottom for making contact with a ground surface. The mobile cattle pen including a back railing including a lockable gate for rear entry and exit therefrom.

The apparatus also including a lift device for automatically raising and lowering the mobile cattle pen over cattle. The lift device including a first arm member having a first end and a second end. The first end of the first arm member having a first roll bar connected thereto and oriented in a position perpendicular to the first arm member. The first roll bar detachably connected to the first side railing of the mobile cattle pen through the plurality of openings in the first side railing. A second arm member having a first end and a second end. The first end of the second arm member having a second roll bar connected thereto and oriented in a position perpendicular to the second arm member. The second roll bar detachably connected to the first side railing of the mobile cattle pen through the plurality of openings in the first side railing. The lift device also including a perpendicular support member connected to the first arm member and the second arm member.

The apparatus further includes a winch assembly that includes a cable, rotating drum and motor. The winch assembly detachably connected to the perpendicular support member of the lift device and the cable of the winch assembly detachably connected to the second end of the first arm member of the lift device. The winch assembly for automated raising and lowering of the first arm member and the second arm member of the lift device. Wherein, upon activation of the motor of the winch assembly, the cable pulls down the first arm member of the lift device to raise the lift device and the mobile cattle pen into the air, and upon releasing the cable the lift device and mobile cattle pen is lowered to make contact with a ground surface.

In some embodiments, the apparatus further includes a vehicle, wherein the winch assembly is detachably mounted to a front portion of the vehicle. In some embodiments, the lift device is detachably mounted to a vehicle such as front-end loader attachment for use with a tractor, for example. While the apparatus may be constructed from a variety of different materials, as disclosed herein, in some embodiments, the mobile cattle pen is constructed substantially from light-weight aluminum.

A method for mobile overhead capture of cattle is also disclosed. In an embodiment, the method includes the steps of connecting a mobile cattle pen for securing cattle therein to a lift device. The mobile cattle pen including an open top, an open bottom, a front railing, a first side railing having a plurality of openings extending through a portion of the first side railing for detachably connecting one or more roll bar thereto and one or more wheel connected substantially near the open bottom and for making contact with a ground surface. The mobile cattle pen further includes a second side railing having one or more wheel connected substantially near the open bottom and for making contact with a ground surface. The mobile cattle pen further includes a back railing including a lockable gate for rear entry and exit therefrom.

The lift device includes a first arm member having a first end and a second end. The first end of the first arm member having a first roll bar connected thereto and oriented in a position perpendicular to the first arm member. The first roll bar detachably connected to the first side railing of the mobile cattle pen through the plurality of openings in the first side railing. The lift device having a second arm member having a first end and a second end. The first end of the second arm member having a second roll bar connected thereto and oriented in a position perpendicular to the second arm member. The second roll bar detachably connected to the first side railing of the mobile cattle pen through the plurality of openings in the first side railing. The lift device further including a perpendicular support member connected to the first arm member and the second arm member.

The method further includes the step of connecting the perpendicular support member of the lift device to a winch assembly. The winch assembly including a cable, rotating drum, and motor. The winch assembly detachably connected to the perpendicular support member of the lift device and the cable of the winch assembly detachably connected to the second end of the first arm member of the lift device. The winch assembly for automated raising and lowering of the first arm member and the second arm member. The method further includes the step of connecting the winch assembly to front portion of a vehicle.

In some embodiments, the method further includes the steps of automatically raising, by means of the winch assembly, the mobile cattle pen over the top of the cattle. The method further includes the step of automatically lowering, by means of the winch assembly, the mobile cattle pen over the top of the cattle. Such that one or more wheel of the mobile cattle pen makes contact with the ground surface when lowered to capture the cattle therein. In some embodiments of the method the vehicle is a utility task vehicle (UTV). Further, in some embodiments of the method, the mobile cattle pen is constructed substantially from aluminum.

Referring now to FIG. 1-9, shown therein is an apparatus (100) for mobile overhead capture of cattle. The apparatus (100) includes a mobile cattle pen (120) for securing cattle therein. The mobile cattle pen (120) having an open top (125), an open bottom (130), a front railing (135) and a first side railing (140). The first side railing (140) having a plurality of openings (145) extending through a portion of the first side railing (140) for detachably connecting one or more roll bar (206 or 230) thereto. The apparatus (100) also having one or more wheel (155) connected substantially near the open bottom (130) for making contact with a ground surface. The apparatus (100) also having a second side railing (160) having one or more wheel (155) connected substantially near the open bottom (130) for making contact with a ground surface. Further, the apparatus including a back railing (165) having a lockable gate (170) for rear entry and exit therefrom.

The apparatus (100) also includes a lift device (190) for automatically raising and lowering the mobile cattle pen (120) over cattle. The lift device (190) having a first arm member (195) having a first end (200) and a second end (205). The first end (200) of the first arm member (195) having a first roll bar (206) connected thereto and oriented in a position perpendicular to the first arm member (195). The first roll bar (206) detachably connected to the first side railing (140) of the mobile cattle pen (120) through the plurality of openings (145) in the first side railing (140). The lift device (190) also including a second arm member (210) having a first end (215) and a second end (220). The first end (215) of the second arm member (210) having a second roll bar (230) connected thereto and oriented in a position perpendicular to the second arm member (210). The second roll bar (230) detachably connected to the first side railing (140) of the mobile cattle pen (120) through the plurality of openings (145) in the first side railing (140). The lift device (190) further including a perpendicular support member (117) connected to the first arm member (195) and the second arm member (210).

The apparatus (100) further including a winch assembly (219) comprising a cable (211), rotating drum (213) and motor (216). The winch assembly (219) detachably connected to the perpendicular support member (117) of the lift device (190) and the cable (211) of the winch assembly (219) detachably connected to the second end (205) of the first arm member (195) of the lift device (190). The winch assembly for automated raising and lowering of the first arm member (195) and the second arm member (210) of the lift device (190). Wherein, upon activation of the motor (216) of the winch assembly (219), the cable (211) pulls down the first arm member (195) of the lift device (190) to raise the lift device (190) and the mobile cattle pen (120) into the air, and upon releasing the cable (211) the lift device (190) and the mobile cattle pen (120) is lowered to make contact with a ground surface.

In some embodiments of the apparatus (100), the winch assembly (219) is detachably mounted to a front portion of a vehicle (300). Further, in some embodiments, the lift device (190) is detachably mounted to a front-end loader attachment detachably connected to a front portion of the vehicle (300). In some embodiments, the vehicle (300) is a utility task vehicle in other embodiments the vehicle may be a tractor, or any other type of vehicle. Further, in some embodiments, the mobile cattle pen (120) is constructed substantially from aluminum.

The mobile cattle pen (120) is configured to be detachably connected to the lift device (190). The lift device (190) is configured to be detachably connected to the winch assembly (219) which is then detachably connected to a front of a vehicle, such as vehicle (100). Likewise, in some embodiments, the lift device (190) may be directly connected to another type of vehicle attachment, such as a front-end loader attachment on a tractor, for example, and without use of the winch assembly (219). The mobile cattle pen (120) has a front railing (135), first side railing (140), second side railing (160) and back railing (165). The back railing (165) includes a lockable gate (170) for rear entry and exit therefrom.

The mobile cattle pen (120) is shown as having a generally rectangular shape, however, it should be understood, that the mobile cattle pen (120) may be constructed in any desired shape, including a substantially rectangular, square, oval, triangular or circular shape for example. The mobile cattle pen (120) is preferably constructed from a light-weight material, such as aluminum. However, it should be understood that the mobile cattle pen (120) may be constructed from any desired material that is sufficiently light-weight, durable, and rigid. For example, steel, carbon fiber, plastics, polymers, synthetic fiber, reinforced fiber, resins, non-metals, composite materials, wood, combinations thereof and the like. The material used for construction should be of a sufficient weight that it can be easily lifted by a standard winch mounted on a UTV, tractor, truck, or other small vehicle, for example, and without over burdening the vehicle transmission.

The durability of the material used for the mobile cattle pen (120) should be of sufficient strength to enclose a calf therein, without bending, breaking, or otherwise distorting or deforming in the event the calf begins to kick or struggle or attempt to escape from the mobile cattle pen (120). Further, the strength of the mobile cattle pen (120) should be sufficient to protect persons within the mobile cattle pen (120) from an attack from a mother cow originating from outside of the mobile cattle pen (120) for example. Thus, providing protection for a person administering medical treatment or other care to a calf that has been captured therein. In some embodiments, the mobile cattle pen (120) may include reinforcing or bracing structures, enclosed walls, ceilings, floors, or sides to provide shade or other protection for the calf and person for example.

The first side railing (140) of the mobile cattle pen (120) includes a plurality of openings (145) extending through a portion of the first side railing (140) for detachably connecting one or more roll bar (206, 230) thereto, such as the first roll bar (206) and the second roll bar (230) of the lift device (190). In use, the one or more roll bar (206 or 230), such as the first roll bar (206) and second roll bar (230) are configured to rotate within the plurality of openings (145) to permit the mobile cattle pen (120) to be raised overhead and lowered over a calf. The back railing (165) includes a lockable gate (170) for rear entry and exit therefrom.

The lift device (190) includes a first arm member (195), a second arm member (210) and a perpendicular support member (117) which connects the first arm member (195) to the second arm member (210). The perpendicular support member (117) for detachably connecting the lift device (190) to the winch assembly (219) or to a front loader attachment, such as on a tractor for example. The perpendicular support member (117) permits the first arm member (195) and second arm member (210) to rotate about the connection point to the perpendicular support member (117), such as by means of a joint, bolt, screw, pin and other connections known in the art.

The lift device (190) is preferably constructed from a light-weight material, such as aluminum. However, it should be understood that the lift device (190) may be constructed from any desired material that is sufficiently light-weight, durable, and rigid. For example, steel, carbon fiber, plastics, polymers, synthetic fiber, reinforced fiber, resins, non-metals, composite materials, wood, combinations thereof and the like. For example, the material should be of a sufficient strength that it can be easily used to lift the mobile cattle pen (120) by a winch on a standard farm or ranch UTV, for example, without over burdening the UTV or other vehicle transmission. Further, the durability and strength of the material should be of sufficient to lift the mobile cattle pen (120) without bending, breaking, or otherwise distorting or deforming the mobile cattle pen (120). In some embodiments, the lift device (190) may include reinforcing or bracing structures to provide additional support and leverage to support raising and lowering the mobile cattle pen (120) over a calf as described herein.

The lift device (190) is configured to be detachably connected to a winch, such as the winch assembly (195), such that when the winch is pulled in by means of a motor, the cable pulls down on one end of the lift device (190) causing the other end of the lift device (190) to lift upward and thereby raise the mobile cattle pen (120) above the ground surface. To lower the mobile cattle pen (120) over a calf, the winch is let out, causing the cable to slowly release and the mobile cattle pen (120) to lower back to its original position in contact with a ground surface. In some embodiments, the lift device (190) is configured to be detachably connected to a front loader attachment for use with a tractor or other similar vehicle, while in other embodiments, the lift device (190) may be detachably connected directly to the vehicle itself, such as by means of welds, joints, screws, bolts, pins and other connections known in the art, for example. In this way, the apparatus (100) may be configured to fit and be used with any type of vehicle.

Figure 10:
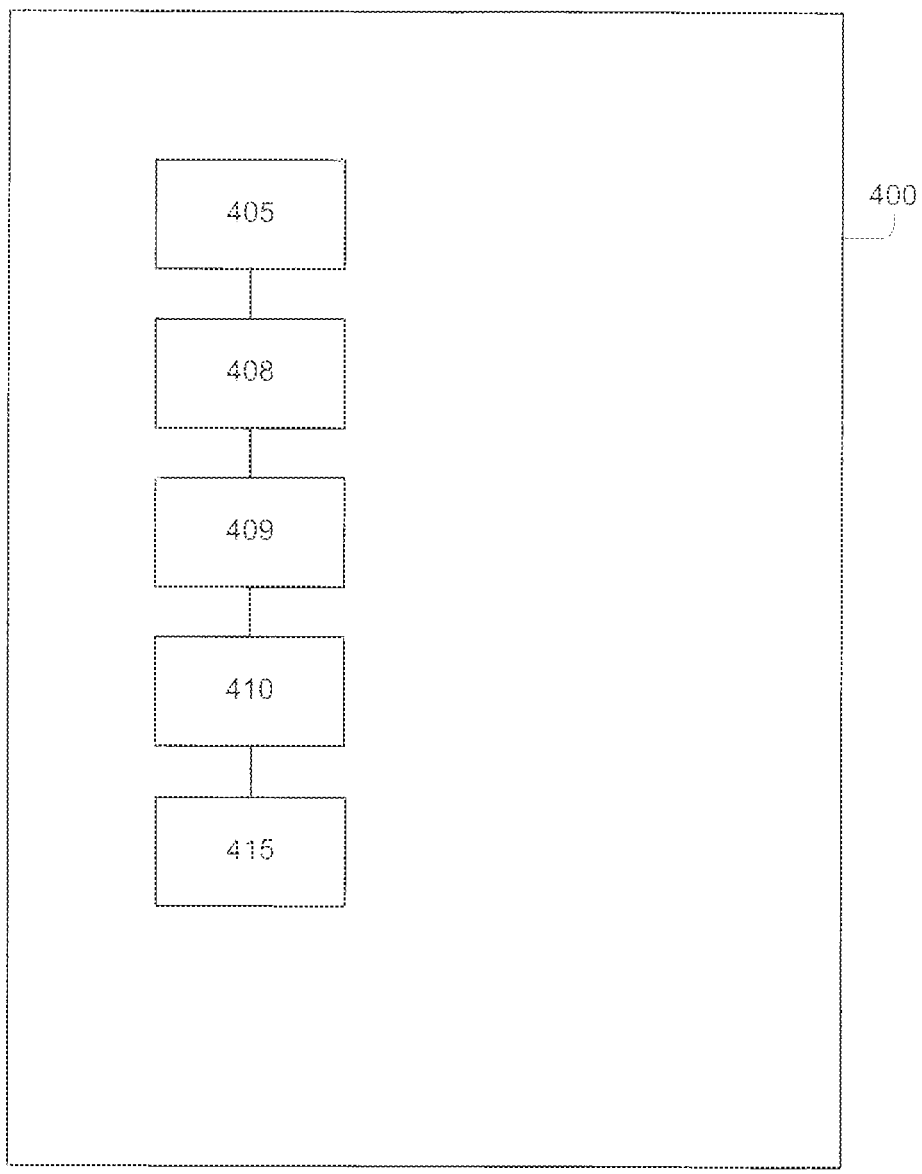
FIG. 10 is a depiction of an embodiment of a method (400) according to the inventive concepts disclosed herein.

Referring now to FIG. 10, shown therein is a method (400) for the mobile overhead capture of cattle. The method (400) generally including the steps of: connecting (405) a mobile cattle pen (120) for securing cattle therein to a lift device (190). The mobile cattle pen (120) including an open top (125), an open bottom (130), a front railing (135) and a first side railing (140). The first side railing (140) having a plurality of openings (145) extending through a portion of the first side railing (140) for detachably connecting one or more roll bar (206, 230) thereto. The mobile cattle pen (120) also including and one or more wheel (155) connected substantially near the open bottom (130) for making contact with a ground surface. The mobile cattle pen (120) further includes a second side railing (160) having one or more wheel (155) connected substantially near the open bottom (130) for making contact with a ground surface. Further, the mobile cattle pen (120) includes a back railing (165) having a lockable gate (170) for rear entry and exit therefrom.

The lift device (190) having a first arm member (195) having a first end (200) and a second end (205). The first end (200) of the first arm member (195) having a first roll bar (206) connected thereto and oriented in a position perpendicular to the first arm member (195). The first roll bar (206) detachably connected to the first side railing (140) of the mobile cattle pen (120) through the plurality of openings (145) in the first side railing (140). The lift device (190) having a second arm member (210) having a first end (215) and a second end (220). The first end (215) of the second arm member (210) having a second roll bar (230) connected thereto and oriented in a position perpendicular to the second arm member (210). The second roll bar (230) detachably connected to the first side railing (140) of the mobile cattle pen (120) through the plurality of openings (145) in the first side railing (140). The lift device (190) also having a perpendicular support member (117) connected to the first arm member (195) and the second arm member (210).

The method (400) also including the step of connecting (408) the perpendicular support member (117) of the lift device (190) to a winch assembly (219). The winch assembly (219) including a cable (211), rotating drum (213), and motor (216). The winch assembly (219) detachably connected to the perpendicular support member (117) of the lift device (190). The cable (211) of the winch assembly (219) detachably connected to the second end (205) of the first arm member (195) of the lift device (190). The winch assembly (219) for automated raising and lowering of the first arm member (195) and the second arm member (210).

The method (400) also including the step of connecting (409) the winch assembly (219) to a front portion of the vehicle (300). In some embodiments, the method (400) also includes the steps of automatically raising (410), by means of the winch assembly (219), the mobile cattle pen (120) over the top of the cattle; and automatically lowering (415), by means of the winch assembly (219), the mobile cattle pen (120) over the top of the cattle, such that one or more wheel (155) of the mobile cattle pen (120) makes contact with the ground surface when lowered to capture the cattle therein. In some embodiments of the method (400), the vehicle (300) is a utility task vehicle. Further, in some embodiments of the method (400), the mobile cattle pen (120) is constructed substantially from aluminum.

The mobile cattle pen (120) is configured to be detachably connected to the lift device (190). The lift device (190) is configured to be detachably connected to the winch assembly (219) which is then detachably connected to a front of a vehicle, such as vehicle (100). Likewise, in some embodiments, the lift device (190) may be directly connected to another type of vehicle attachment, such as a front-end loader attachment on a tractor, for example, and without use of the winch assembly (219). The mobile cattle pen (120) has a front railing (135), first side railing (140), second side railing (160) and back railing (165). The back railing (165) includes a lockable gate (170) for rear entry and exit therefrom.

The mobile cattle pen (120) is shown as having a generally rectangular shape, however, it should be understood, that the mobile cattle pen (120) may be constructed in any desired shape, including a substantially rectangular, square, oval, triangular or circular shape for example. The mobile cattle pen (120) is preferably constructed from a light-weight material, such as aluminum. However, it should be understood that the mobile cattle pen (120) may be constructed from any desired material that is sufficiently light-weight, durable, and rigid. For example, steel, carbon fiber, plastics, polymers, synthetic fiber, reinforced fiber, resins, non-metals, composite materials, wood, combinations thereof and the like. The material used for construction should be of a sufficient weight that it can be easily lifted by a standard winch mounted on a UTV, tractor, truck, or other small vehicle, for example, and without over burdening the vehicle transmission.

The durability of the material used for the mobile cattle pen (120) should be of sufficient strength to enclose a calf therein, without bending, breaking, or otherwise distorting or deforming in the event the calf begins to kick or struggle or attempt to escape from the mobile cattle pen (120). Further, the strength of the mobile cattle pen (120) should be sufficient to protect persons within the mobile cattle pen (120) from an attack from a mother cow originating from outside of the mobile cattle pen (120) for example. Thus, providing protection for a person administering medical treatment or other care to a calf that has been captured therein. In some embodiments, the mobile cattle pen (120) may include reinforcing or bracing structures, enclosed walls, ceilings, floors, or sides to provide shade or other protection for the calf and person for example.

The first side railing (140) of the mobile cattle pen (120) includes a plurality of openings (145) extending through a portion of the first side railing (140) for detachably connecting one or more roll bar (206, 230) thereto, such as the first roll bar (206) and the second roll bar (230) of the lift device (190). In use, the one or more roll bar (206, 230), such as the first roll bar (206) and second roll bar (230) are configured to rotate within the plurality of openings (145) to permit the mobile cattle pen (120) to be raised overhead and lowered over a calf. The back railing (165) includes a lockable gate (170) for rear entry and exit therefrom.

The lift device (190) includes a first arm member (195), a second arm member (210) and a perpendicular support member (117) which connects the first arm member (195) to the second arm member (210). The perpendicular support member (117) for detachably connecting the lift device (190) to the winch assembly (219) or to a front loader attachment, such as on a tractor for example. The perpendicular support member (117) permits the first arm member (195) and second arm member (210) to rotate about the connection point to the perpendicular support member (117), such as by means of a joint, bolt, screw, pin and other connections known in the art.

The lift device (190) is preferably constructed from a light-weight material, such as aluminum. However, it should be understood that the lift device (190) may be constructed from any desired material that is sufficiently light-weight, durable, and rigid. For example, steel, carbon fiber, plastics, polymers, synthetic fiber, reinforced fiber, resins, non-metals, composite materials, wood, combinations thereof and the like. For example, the material should be of a sufficient strength that it can be easily used to lift the mobile cattle pen (120) by a winch on a standard farm or ranch UTV, for example, without over burdening the UTV or other vehicle transmission. Further, the durability and strength of the material should be of sufficient to lift the mobile cattle pen (120) without bending, breaking, or otherwise distorting or deforming the mobile cattle pen (120). In some embodiments, the lift device (190) may include reinforcing or bracing structures to provide additional support and leverage to support raising and lowering the mobile cattle pen (120) over a calf as described herein.

The lift device (190) is configured to be detachably connected to a winch, such as the winch assembly (195), such that when the winch is pulled in by means of a motor, the cable pulls down on one end of the lift device (190) causing the other end of the lift device (190) to lift upward and thereby raise the mobile cattle pen (120) above the ground surface. To lower the mobile cattle pen (120) over a calf, the winch is let out, causing the cable to slowly release and the mobile cattle pen (120) to lower back to its original position in contact with a ground surface. In some embodiments, the lift device (190) is configured to be detachably connected to a front loader attachment for use with a tractor or other similar vehicle, while in other embodiments, the lift device (190) may be detachably connected directly to the vehicle itself, such as by means of welds, joints, screws, bolts, pins and other connections known in the art, for example. In this way, the apparatus (100) may be configured to fit and be used with any type of vehicle.

It should be understood that embodiments of the inventive concepts disclosed herein may be offered, shipped or sold separately or together as a kit and the like for example.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. An apparatus for mobile overhead capture of cattle comprising:
    a mobile cattle pen for securing cattle therein and for detachably connecting to a front portion of a vehicle, the mobile cattle pen comprising an open top, an open bottom, a front railing, a first side railing having a plurality of openings extending through a portion of the first side railing for detachably connecting one or more roll bar thereto and one or more wheel connected substantially near the open bottom and for making contact with a ground surface, a second side railing having one or more wheel connected substantially near the open bottom and for making contact with a ground surface, and a back railing comprising a lockable gate for rear entry and exit therefrom, wherein the orientation of the lockable gate in relation to the orientation of the vehicle and the orientation of the front railing, first side railing, and second side railing, is such that the lockable gate opens from the rear in the same orientation as the rear of the vehicle and the lockable gate is positioned substantially perpendicular to a side door of the vehicle so that the front of the mobile cattle pen and the front of the vehicle provide a protective barrier for a user to exit the side door of the vehicle and access the lockable gate of the mobile cattle pen from the rear of the apparatus when the mobile cattle pen is detachably connected to the vehicle; and
    a lift device for raising and lowering the mobile cattle pen over cattle, the lift device comprising a first arm member having a first end and a second end, the first end of the first arm member having a first roll bar connected thereto and oriented in a position perpendicular to the first arm member, the first roll bar detachably connected to the first side railing of the mobile cattle pen through the plurality of openings in the first side railing, and a second arm member having a first end and a second end, the first end of the second arm member having a second roll bar connected thereto and oriented in a position perpendicular to the second arm member, the second roll bar detachably connected to the first side railing of the mobile cattle pen through the plurality of openings in the first side railing, and a perpendicular support member connected to the first arm member and the second arm member;
    a winch assembly comprising a cable, rotating drum and motor, the winch assembly detachably connected to the perpendicular support member of the lift device and the cable of the winch assembly detachably connected to the second end of the first arm member of the lift device, the winch assembly for automated raising and lowering of the first arm member and the second arm member of the lift device;
    wherein, upon activation of the motor of the winch assembly, the cable pulls down the first arm member of the lift device to raise the lift device and the mobile cattle pen into the air, and upon releasing the cable the lift device and mobile cattle pen is lowered to make contact with a ground surface.

2. The apparatus of claim 1, further comprising a vehicle, wherein the winch assembly is detachably mounted to a front portion of the vehicle.

3. The apparatus of claim 2, wherein the vehicle is a utility task vehicle.

4. The apparatus of claim 1, wherein the mobile cattle pen is constructed substantially from aluminum.

5. A method for mobile overhead capture of cattle, the method comprising the steps of:
    connecting a mobile cattle pen for securing cattle therein and for detachably connecting to a front portion of a vehicle to a lift device, the mobile cattle pen comprising an open top, an open bottom, a front railing, a first side railing having a plurality of openings extending through a portion of the first side railing for detachably connecting one or more roll bar thereto and one or more wheel connected substantially near the open bottom and for making contact with a ground surface, a second side railing having one or more wheel connected substantially near the open bottom and for making contact with a ground surface, and a back railing comprising a lockable gate for rear entry and exit therefrom, wherein the orientation of the lockable gate in relation to the orientation of the vehicle and the orientation of the front railing, first side railing, and second side railing, is such that the lockable gate opens from the rear in the same orientation as the rear of the vehicle and the lockable gate is positioned substantially perpendicular to a side door of the vehicle so that the front of the mobile cattle pen and the front of the vehicle provide a protective barrier for a user to exit the side door of the vehicle and access the lockable gate of the mobile cattle pen from the rear of the apparatus when the mobile cattle pen is detachably connected to the vehicle, the lift device comprising a first arm member having a first end and a second end, the first end of the first arm member having a first roll bar connected thereto and oriented in a position perpendicular to the first arm member, the first roll bar detachably connected to the first side railing of the mobile cattle pen through the plurality of openings in the first side railing, and a second arm member having a first end and a second end, the first end of the second arm member having a second roll bar connected thereto and oriented in a position perpendicular to the second arm member, the second roll bar detachably connected to the first side railing of the mobile cattle pen through the plurality of openings in the first side railing, and a perpendicular support member connected to the first arm member and the second arm member, connecting the perpendicular support member of the lift device to a winch assembly, the winch assembly comprising a cable, rotating drum and motor, the winch assembly detachably connected to the perpendicular support member of the lift device and the cable of the winch assembly detachably connected to the second end of the first arm member of the lift device, the winch assembly for automated raising and lowering of the first arm member and the second arm member; and connecting the winch assembly to a front portion of a vehicle.

6. The method of claim 5, further comprising the steps of:
automatically raising, by means of the winch assembly, the mobile cattle pen over the top of cattle; and
automatically lowering, by means of the winch assembly, the mobile cattle pen over the top of the cattle, such that one or more wheel of the mobile cattle pen makes contact with the ground surface when lowered to capture the cattle therein.

7. The method of claim 5, wherein the vehicle is a utility task vehicle.

8. The method of claim 5, wherein the mobile cattle pen is constructed substantially from aluminum.

* * * * *